(12) United States Patent
Tseng

(10) Patent No.: US 9,603,038 B2
(45) Date of Patent: Mar. 21, 2017

(54) METHOD AND APPARATUS FOR SMALL CELL ENHANCEMENTS IN A WIRELESS COMMUNICATION SYSTEM

(71) Applicant: INNOVATIVE SONIC CORPORATION, Taipei (TW)

(72) Inventor: Li-Chih Tseng, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 60 days.

(21) Appl. No.: 14/226,175

(22) Filed: Mar. 26, 2014

(65) Prior Publication Data

US 2014/0293873 A1 Oct. 2, 2014

Related U.S. Application Data

(60) Provisional application No. 61/807,103, filed on Apr. 1, 2013.

(51) Int. Cl.
| | |
|---|---|
| H04W 16/26 | (2009.01) |
| H04W 24/04 | (2009.01) |
| H04W 72/04 | (2009.01) |
| H04W 76/04 | (2009.01) |
| H04W 76/06 | (2009.01) |
| H04W 24/02 | (2009.01) |
| H04W 84/04 | (2009.01) |
| H04W 36/00 | (2009.01) |

(52) U.S. Cl.
CPC ........... *H04W 24/04* (2013.01); *H04W 24/02* (2013.01); *H04W 72/04* (2013.01); *H04W 76/045* (2013.01); *H04W 76/064* (2013.01); *H04W 36/00* (2013.01); *H04W 84/045* (2013.01)

(58) Field of Classification Search
CPC . H04W 16/26; H04W 76/048; H04W 72/042; H04W 72/1284; H04W 84/045; H04W 36/04; H04W 36/22
USPC ............... 370/328, 329, 280, 252, 331, 235; 455/450, 458, 436
See application file for complete search history.

(56) References Cited

U.S. PATENT DOCUMENTS

| | | | |
|---|---|---|---|
| 8,923,127 B2 * | 12/2014 | Hayashi | ......................... 370/235 |
| 2011/0130099 A1 | 6/2011 | Madan et al. | |
| 2011/0177815 A1 * | 7/2011 | Jeong et al. | .................. 455/436 |

(Continued)

FOREIGN PATENT DOCUMENTS

| | | |
|---|---|---|
| EP | 1915017 A2 | 4/2008 |
| EP | 2309817 A1 | 8/2010 |

(Continued)

OTHER PUBLICATIONS

3GPP TSG-RAN WG2 #81 Malta. Jan. 28-Feb. 1, 2013 (R2-130420).

(Continued)

*Primary Examiner* — Jamal Javaid
(74) *Attorney, Agent, or Firm* — Blue Capital Law Firm, P.C.

(57) ABSTRACT

Methods and apparatuses are disclosed for small cell enhancement in a wireless communication system. The method includes having a user equipment (UE) connected to a Macro evolved Node B (eNB. The method further includes configuring the UE to establish a very first Small Cell through a Radio Resource Control (RRC) message, wherein the very first Small Cell belongs to a Small Cell eNB different from the Macro eNB.

16 Claims, 5 Drawing Sheets

(56) References Cited

U.S. PATENT DOCUMENTS

| | | | |
|---|---|---|---|
| 2011/0321050 A1 | 12/2011 | Ho et al. | |
| 2012/0281548 A1 | 11/2012 | Lin et al. | |
| 2013/0077507 A1* | 3/2013 | Yu et al. ................ | 370/252 |
| 2013/0136027 A1* | 5/2013 | Matsuo et al. ............ | 370/252 |
| 2014/0092865 A1* | 4/2014 | Heo et al. ................ | 370/331 |
| 2014/0169238 A1* | 6/2014 | Cai et al. ................ | 370/280 |

FOREIGN PATENT DOCUMENTS

| | | |
|---|---|---|
| EP | 2302968 A2 | 3/2011 |
| JP | 2014-187651 | 2/2014 |
| JP | 2014-158238 A | 8/2014 |
| WO | 2010017376 A1 | 2/2010 |
| WO | 2011082110 A1 | 7/2011 |
| WO | 2012019362 A1 | 2/2012 |
| WO | 2012130055 A1 | 10/2012 |
| WO | 2012136269 A1 | 10/2012 |
| WO | 2013010418 A1 | 1/2013 |
| WO | 2013023681 A1 | 2/2013 |
| WO | 2013023959 A1 | 2/2013 |

OTHER PUBLICATIONS

3GPP TSG-RAN WG2 Meeting #81 St. Julian's, Malta, Jan. 28-Feb. 1, 2013 (R2-130228).
3GPP TSG-RAN WG2 Meeting #81 St. Julian's, Malta, Jan. 28-Feb. 1, 2013 (R2-130570).
3GPP TSG-RAN WG2 Meeting #82 Fukuoka, Japan, May 20-24, 2013 (R2-131964).
3GPP TSG-RAN WG2 Meeting #83bis Ljubljana, Slovenia, Oct. 7-11, 2013 (R2-133496).
3GPP TSG-RAN WG2 Meeting #84 San Francisco, USA, Nov. 11-15, 2013 (R2-133855).
Search Report on corresponding EP Patent Application No. 14159315.2 dated Nov. 6, 2014.
Search Report on corresponding EP Patent Application No. 14159317.8 dated Nov. 24, 2014.
Search Report on corresponding EP Patent Application No. 14162735.6 dated Oct. 13, 2014.
Search Report on corresponding EP Patent Application No. 14162778.6 dated Oct. 13, 2014.
3GPP TS 36.323 V11.2.0 (Mar. 2013).
Search Report on corresponding EP Patent Application No. 14161761.3 dated Dec. 4, 2014.
Search Report on corresponding EP Patent Application No. 14162304.1 dated Dec. 9, 2014.
3GPP TSG-RAN WG2 Meeting #81, Jan. 28-Feb. 1, 2013, St. Julian's, Malta (R2-130614).
Office Action on corresponding JP Patent Application No. 2014-067351 dated Feb. 24, 2015.
3GPP TSG-RAN WG2#79 Qingdao, China, Aug. 13-17, 2012, Tdoc R2-124071.
Office Action on corresponding TW Patent Application No. 103111917 dated Apr. 30, 2015.
Office Action on corresponding JP Patent Application No. 2014-067350 dated Mar. 31, 2015.
Office Action on corresponding TW Patent Application No. 103111394 dated Dec. 15, 2015.

* cited by examiner

METHOD AND APPARATUS FOR SMALL CELL ENHANCEMENTS IN A WIRELESS COMMUNICATION SYSTEM

CROSS-REFERENCE TO RELATED APPLICATIONS

The present Application claims the benefit of U.S. Provisional Patent Application Ser. No. 61/807,103 filed on Apr. 1, 2013, the entire disclosure of which is incorporated herein by reference.

FIELD

This disclosure generally relates to wireless communication networks, and more particularly, to methods and apparatuses for small cell enhancement in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

Methods and apparatuses are disclosed for small cell enhancement in a wireless communication system. The method includes having a user equipment (UE) connected to a Macro evolved Node B (eNB). The method further includes configuring the UE to establish a very first Small Cell through a Radio Resource Control (RRC) message, wherein the very first Small Cell belongs to a Small Cell eNB different from the Macro eNB.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. TS36.321 v11.2.0 (March 2013) entitled "E-UTRA; MAC protocol specification," TR36.392 v12.0.0 (December 2012) entitled "Scenarios and Requirements for Small Cell Enhancements for E-UTRA and E-UTRAN," R2-130420 entitled "Protocol architecture alternatives for dual connectivity," TR 36.913, RP-122033 entitled "New Study Item Description: Small Cell enhancements for E-UTRA and E-UTRAN—Higher-layer aspects," and 3GPP R2-130570 entitled "Report of 3GPP TSG RAN WG2 meeting #72." The standards and documents listed above are hereby expressly incorporated by reference in their entirety.

Figure 1:
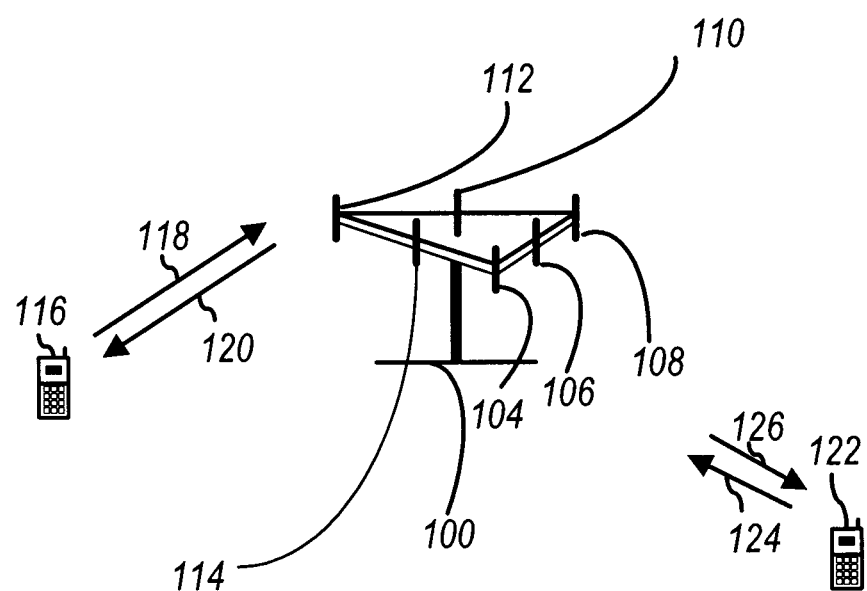
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNB, or some other terminology. An access terminal (AT) may also be called user equipment (UE), a wireless communication device, terminal, access terminal or some other terminology.

Figure 2:
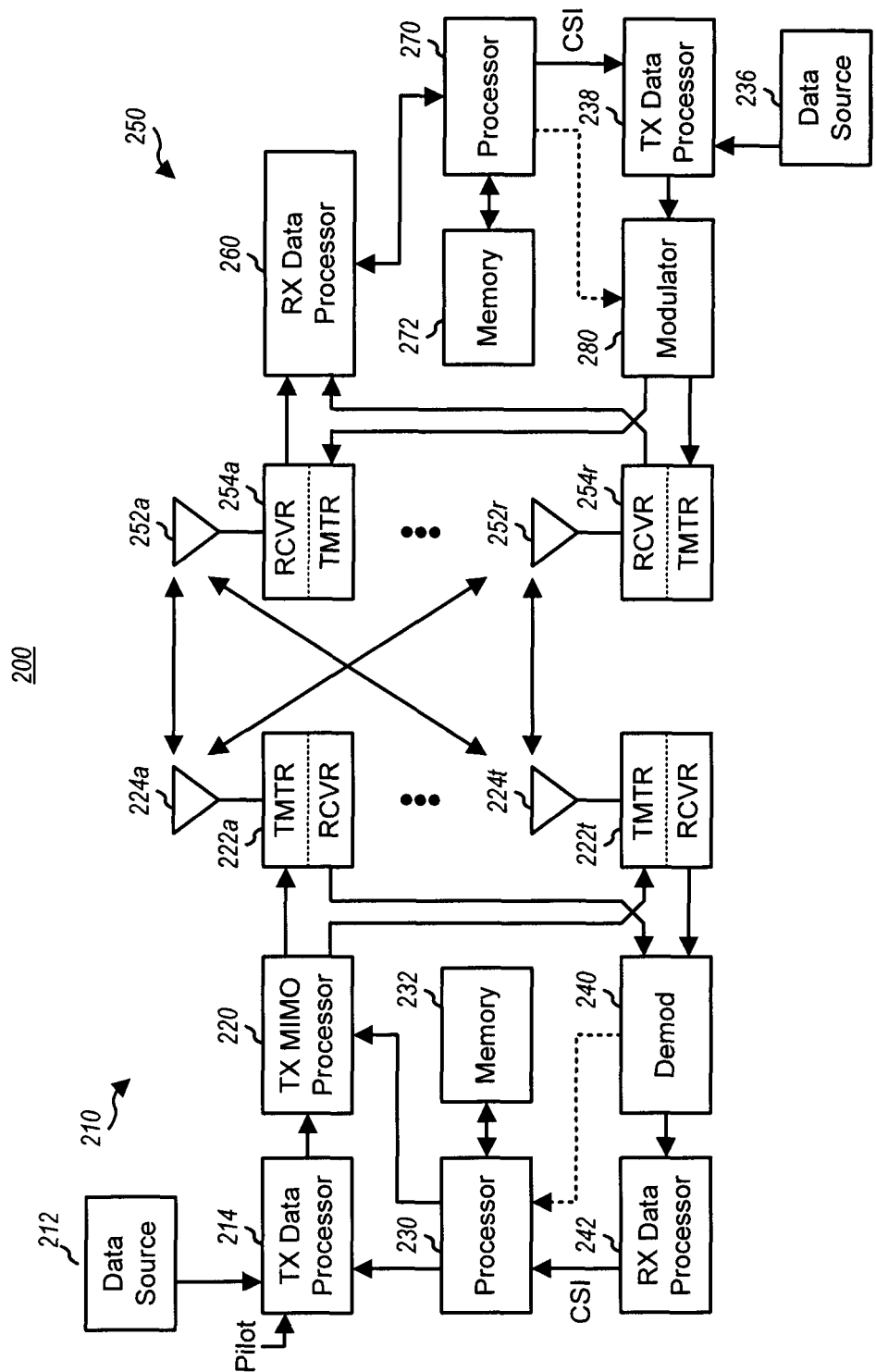
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
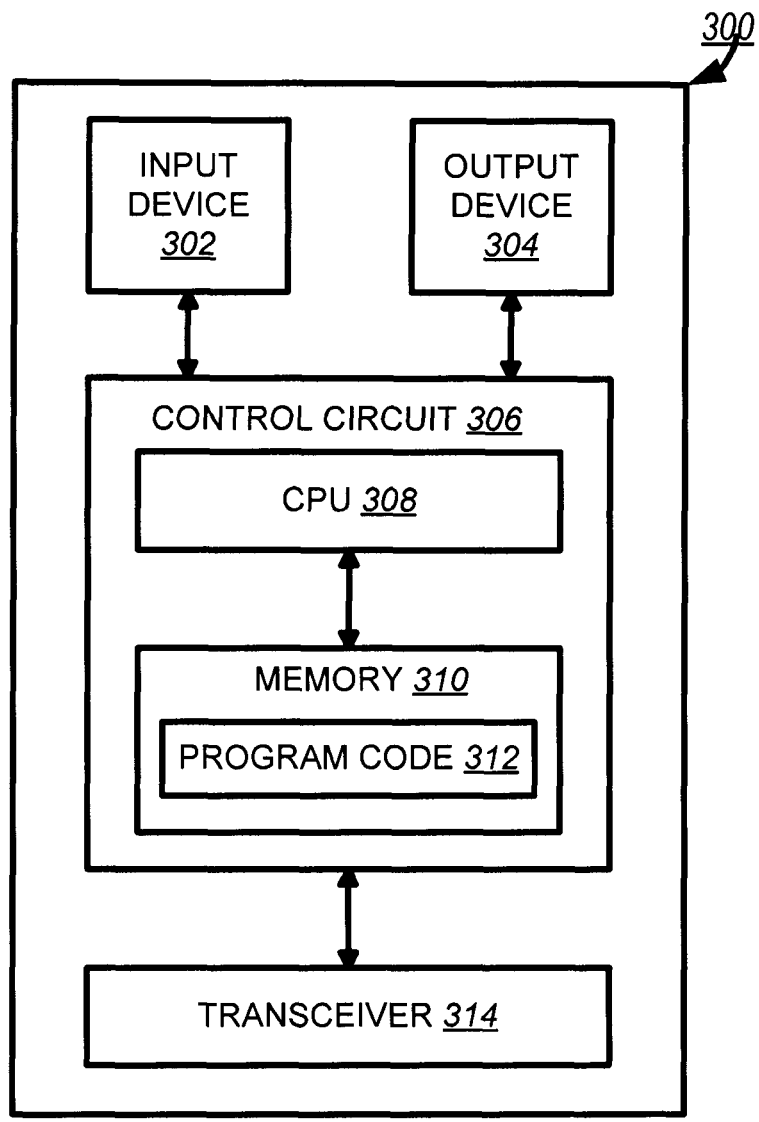
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
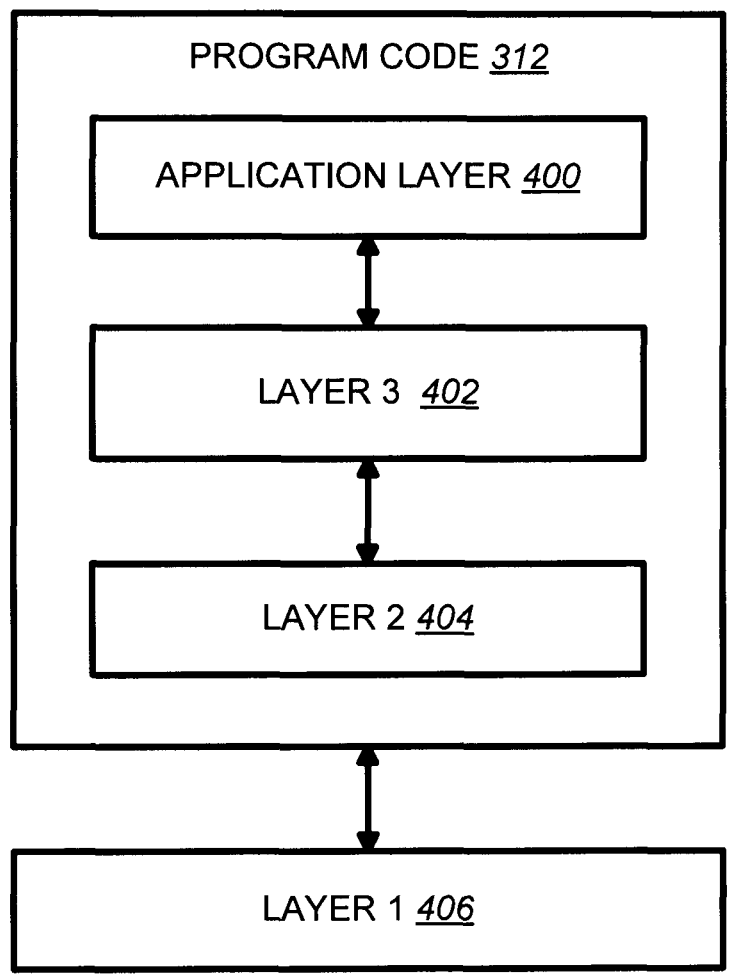
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE or LTE-A systems, the Layer 2 portion may include a Radio Link Control (RLC) layer and a Medium Access Control (MAC) layer. The Layer 3 portion may include a Radio Resource Control (RRC) layer.

In 3GPP TS36.321 v11.2.0, Scheduling Request (SR) operation with different Physical Uplink Control Channel resource is discussed as follows:

5.4.4 Scheduling Request

The Scheduling Request (SR) is used for requesting UL-SCH resources for new transmission.

When an SR is triggered, it shall be considered as pending until it is cancelled. All pending SR(s) shall be cancelled and sr-ProhibitTimer shall be stopped when a MAC PDU is assembled and this PDU includes a BSR which contains buffer status up to (and including) the last event that triggered a BSR (see subclause 5.4.5), or when the UL grant(s) can accommodate all pending data available for transmission.

If an SR is triggered and there is no other SR pending, the UE shall set the SR_COUNTER to 0.

As long as one SR is pending, the UE shall for each TTI:
if no UL-SCH resources are available for a transmission in this TTI:
if the UE has no valid PUCCH resource for SR configured in any TTI: initiate a Random Access procedure (see subclause 5.1) on the PCell and cancel all pending SRs;
else if the UE has a valid PUCCH resource for SR configured for this TTI and if this TTI is not part of a measurement gap and if sr-ProhibitTimer is not running:
if SR_COUNTER<dsr-TransMax:
increment SR_COUNTER by 1;
instruct the physical layer to signal the SR on PUCCH;
start the sr-ProhibitTimer.
else:
notify RRC to release PUCCH/SRS for all serving cells;
clear any configured downlink assignments and uplink grants;
initiate a Random Access procedure (see subclause 5.1) on the PCell and cancel all pending SRs.

5.4.5 Buffer Status Reporting

The Buffer Status reporting procedure is used to provide the serving eNB with information about the amount of data available for transmission in the UL buffers of the UE. RRC controls BSR reporting by configuring the two timers periodicBSR-Timer and retxBSR-Timer and by, for each logical channel, optionally signalling logicalChannelGroup which allocates the logical channel to an LCG.

For the Buffet Status reporting procedure, the UE shall consider all radio bearers which are not suspended and may consider radio bearers which are suspended.

A Buffer Status Report (BSR) shall be triggered if any of the following events occur:
UL data, for a logical channel which belongs to a LCG, becomes available for transmission in the RLC entity or in the PDCP entity (the definition of what data shall be considered as available for transmission is specified in 3GPP RP-122033 and 3GPP TS 36.300 V11.4.0 respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";
UL resources are allocated and number of padding bits is equal to or larger than the size of the Buffer Status Report MAC control element plus its subheader, in which case the BSR is referred below to as "Padding BSR";
retxBSR-Timer expires and the UE has data available for transmission for any of the logical channels which belong to a LCG, in which case the BSR is referred below to as "Regular BSR";
periodicBSR-Timer expires, in which case the BSR is referred below to as "Periodic BSR".
For Regular and Periodic BSR:
if more than one LCG has data available for transmission in the TTI where the BSR is transmitted: report Long BSR;
else report Short BSR.
For Padding BSR:
if the number of padding bits is equal to or larger than the sixe of the Short BSR plus its subheader but smaller than the sixe of the long BSR plus its subheader:
if more than one LCG has data available for transmission in the TTI where the BSR is transmitted: report Truncated BSR of the LCG with the highest priority logical channel with data available for transmission:
else report Short BSR.
else if the number of padding bits is equal to or larger than the size of the Long BSR plus its subheader, report Long BSR.

If the Buffer Status reporting procedure determines that at least one BSR has been triggered and not cancelled:
if the UE has UL resources allocated for new transmission for this TTI:
instruct the Multiplexing and Assembly procedure to generate the BSR MAC control element(s);
start or restart periodicBSR-Timer except when all the generated BSRs are Truncated BSRs;
start or restart retxBSR-Timer.
else if a Regular BSR has been triggered:
if an uplink grant is not configured or the Regular BSR was not triggered due to data becoming available for transmission for a logical channel for which logical channel SR masking (logicalChannelSR-Mask) is setup by upper layers:
a Scheduling Request shall be triggered.

A MAC PDU shall contain at most one MAC BSR control element, even when multiple events trigger a BSR by the time a BSR can be transmitted in which case the Regular BSR and the Periodic BSR shall have precedence over the padding BSR.

The UE shall restart retxBSR-Timer upon indication of a grant for transmission of new data on any UL-SCH.

All triggered BSRs shall be cancelled in case the UL grant(s) in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

NOTE: A Padding BSR is not allowed to cancel a triggered Regular/Periodic BSR. A Padding BSR is triggered for a specific MAC PDU only and the trigger is cancelled when this MAC PDU has been built.

5.7 Discontinuous Reception (DRX)

The UE may be configured by RRC with a DRX functionality that controls the UE's PDCCH monitoring activity for the UE's C-RNTI, TPC-PUCCH-RNTI, TPC-PUSCH-RNTI and Semi-Persistent Scheduling C-RNTI (if configured). When in RRC_CONNECTED, if DRX is configured, the UE is allowed to monitor the PDCCH discontinuously using the DRX operation specified in this subclause; otherwise the UE monitors the PDCCH continuously. When using DRX operation, the UE shall also monitor PDCCH according to requirements found in other subclauses of this specification. RRC controls DRX operation by configuring the timers onDurationTimer, drx-InactivityTimer, drx-RetransmissionTimer (one per DL HARQ process except for the broadcast process), the longDRX-Cycle, the value of the drxStartOffset and optionally the drxShortCycleTimer and shortDRX-Cycle. A HARQ RTT timer per DL HARQ process (except for the broadcast process) is also defined (see subclause 7.7).

When a DRX cycle is configured, the Active Time includes the time while:
- onDurationTimer or drx-InactivityTimer or drx-RetransmissionTimer or mac-ContentionResolutionTimer (as described in subclause 5.1.5) is running; or
- a Scheduling Request is sent on PUCCH and is pending (as described in subclause 5.4.4); or
- an uplink grant for a pending HARQ retransmission can occur and there is data in the corresponding HARQ buffer; or
- a PDCCH indicating a new transmission addressed to the C-RNTI of the UE has not been received after successful reception of a Random Access Response for the preamble not selected by the UE (as described in subclause 5.1.4).

When DRX is configured, the UE shall for each subframe:
if a HARQ RTT Timer expires in this subframe and the data of the corresponding HARQ process was not successfully decoded:
start the drx-RetransmissionTimer for the corresponding HARQ process.
if a DRX Command MAC control element is received:
stop onDurationTimer;
stop drx-InactivityTimer.
if drx-InactivityTimer expires or a DRX Command MAC control element is received in this subframe:
if the Short DRX cycle is configured:
start or restart drxShortCycleTimer;
use the Short DRX Cycle.
else:
use the Long DRX cycle.
if drxShortCycleTimer expires in this subframe:
use the Long DRX cycle.
If the Short DRX Cycle is used and [(SFN*10)+subframe number] modulo (shortDRX-Cycle)=(drxStartOffset) modulo (shortDRX-Cycle); or
if the Long DRX Cycle is used and [(SFN*10)+subframe number] modulo (longDRX-Cycle)=drxStartOffset:
start onDurationTimer.
during the Active Time, for a PDCCH-subframe, if the subframe is not required for uplink transmission for half-duplex FDD UE operation and if the subframe is not part of a configured measurement gap:
monitor the PDCCH;
if the PDCCH indicates a DL transmission or if a DL assignment has been configured for this subframe:
start the HARQ RTT Timer for the corresponding HARQ process;
stop the drx-RetransmissionTimer for the corresponding HARQ process.
if the PDCCH indicates a new transmission (DL or UL):
start or restart drx-InactivityTimer.
in current subframe n, if the UE would not be in Active Time according to grants/assignments received until and including subframe n−4, type-0-triggered SRS (3GPP TR36.392 v12.0.0) shall not be reported.
if CQI masking (cqi-Mask) is setup by upper layers:
in current subframe n, if onDurationTimer would not be running according to grants/assignments received until and including subframe n−4, CQI/MI/RI/PTI on PUCCH shall not be reported.
else:
in current subframe n, if the UE would not be in Active Time according to grants/assignments received until and including subframe n−4, CQI/PMI/RI/PTI on PUCCH shall not be reported.

Regardless of whether the UE is monitoring PDCCH or not, the UE receives and transmits HARQ feedback and transmits type-1-triggered SRS 3GPP TR36.392 v12.0.0 when such is expected.
NOTE: The same active time applies to all activated serving cell(s).

5.13 Activation/Deactivation of SCells

If the UE is configured with one or more SCells, the network may activate and deactivate the configured SCells. The PCell is always activated. The network activates and deactivates the SCell(s) by sending the Activation/Deactivation MAC control element described in subclause 6.1.3.8. Furthermore, the UE maintains a sCellDeactivationTimer timer per configured SCell and deactivates the associated SCell upon its expiry. The same initial timer value applies to each instance of the sCellDeactivationTimer and it is configured by RRC. The configured SCells are initially deactivated upon addition and after a handover.

The UE shall for each TTI and for each configured SCell:
if the UE receives an Activation/Deactivation MAC control element in this TTI activating the SCell, the UE shall in the TTI according to the timing defined in [2]:
activate the SCell; i.e. apply normal SCell operation including:
SRS transmissions on the SCell;
CQI/PMI/RI/PTI reporting for the SCell;
PDCCH monitoring on the SCell;
PDCCH monitoring for the SCell
start or restart the sCellDeactivationTimer associated with the SCell;
else, if the UE receives an Activation/Deactivation MAC control element in this TTI deactivating the SCell; or
if the sCellDeactivationTimer associated with the activated SCell expires in this TTI:
in the TTI according to the timing defined in 3GPP TR36.392 v12.0.0:
deactivate the SCell;
stop the sCellDeactivationTimer associated with the SCell;
flush all HARQ buffers associated with the SCell.
if PDCCH on the activated SCell indicates an uplink grant or downlink assignment; or
if PDCCH on the Serving Cell scheduling the activated SCell indicates an uplink grant or a downlink assignment for the activated SCell:
restart the sCellDeactivationTimer associated with the SCell;
if the SCell is deactivated:
not transmit SRS on the SCell;
not report CQI/PMI/RI/PTI for the SCell;
not transmit on UL-SCH on the SCell;
not transmit on RACH on the SCell;
not monitor the PDCCH on the SCell;
not monitor the PDCCH for the SCell.
NOTE: When SCell is deactivated, the ongoing Random Access procedure on the SCell, if any, is aborted.

6.1.3.1 Buffer Status Report MAC Control Elements

Figure 6:
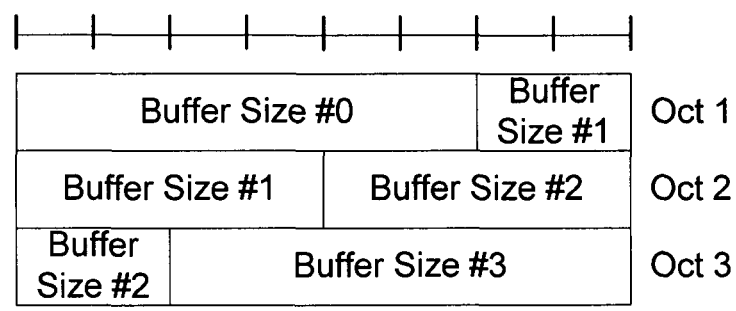
FIG. 6 is a reproduction of Figure 6.1.3.1-2 of 3GPP TS36.321 v11.2.0.

Buffer Stains Report (BSR) MAC control elements consist of either:
Short BSR and Truncated BSR format: one LCG ID field and one corresponding Buffer Size field (figure 6.1.3.1-1): or
Long BSR format: four Buffer Size Fields, corresponding to LCG IDs #0 through #3 (figure 6.1.3.1-2).
The BSR formats are identified by MAC PDU subheaders with LCIDs as specified in table 6.2.1-2.

The fields LCG ID and Buffer Size are defined as follow:

LCG ID: The Logical Channel Group ID field identifies the group of logical channel(s) which buffer status is being reported. The length of the field is 2 bits;

Buffer Size: The Buffer Size field identifies the total amount of data available across all logical channels of a logical channel group after all MAC PDUs for the TTI have been built. The amount of data is indicated in number of bytes. It shall include all data that is available for transmission in the RLC layer and in the PDCP layer; the definition of what data shall be considered as available for transmission is specified in 3GPP RP-122033 and 3GPP TS 36.300 V11.4.0, respectively. The size of the RLC and MAC headers are not considered in the buffer size computation. The length of this field is 6 bits. If extendedBSR-Sizes is not configured, the values taken by the Buffer Size field are shown in Table 6.1.3.1-1. If extendedBSR-Sizes is configured, the values taken by the Buffer Size field are shown in Table 6.1.3.1-2.

Figure 5:
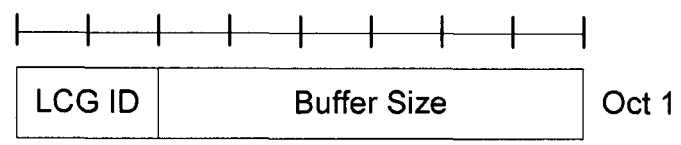
FIG. 5 is a reproduction of Figure 6.1.3.1-1 of 3GPP TS36.321 v11.2.0.

[Figure 6.1.3.1-1 of 3GPP TS36.321 v11.2.0 is reproduced as FIG. 5 of the present application]

[Figure 6.1.3.1-2 of 3GPP TS36.321 v11.2.0 is reproduced as FIG. 6 of the present application]

3GPP TR36.392 v12.0.0 discloses the following:

Small cells using low power nodes are considered promising to cope with mobile traffic explosion, especially for hotspot deployments in indoor and outdoor scenarios. A low-power node generally means a node whose Tx power is lower than macro node and BS classes, for example Pico and Femto eNB are both applicable. Small cell enhancements for E-UTRA and E-UTRAN will focus on additional functionalities for enhanced performance in hotspot areas for indoor and outdoor using low power nodes.

This document captures the scenarios and requirements for small cell enhancements. 3GPP TR 36.913 should be used as reference whenever applicable in order to avoid duplication of the requirements.

3GPP RP-122033 discloses the following:

4 Objective

The objective of this study is to identity potential technologies in the protocol and architecture for enhanced support of small cell deployment and operation which should satisfy scenarios and requirements defined in TR 36.932.

The study shall be conducted on the following aspects:

Identify and evaluate the benefits of UEs having dual connectivity to macro and small cell layers served by different or same carrier and for which scenarios such dual connectivity is feasible and beneficial.

Identify and evaluate potential architecture and protocol enhancements for the scenarios in TR 36.932 and in particular for the feasible scenario of dual connectivity and minimize core network impacts if feasible, including:

Overall structure of control and user plane and their relation to each other, e.g., supporting C-plane and U-plane in different nodes, termination of different protocol layers, etc.

Identify and evaluate the necessity of overall Radio Resource Management structure and mobility enhancements for small cell deployments:

Mobility mechanisms for minimizing inter-node UE context transfer and signalling towards the core network.

Measurement and cell identification enhancements while minimizing increased UE battery consumption.

For each potential enhancement, the gain, complexity and specification impact should be assessed.

The study shall focus on potential enhancements which are not covered by other SI/WIs.

In 3GPP TS36.300 discusses Carrier Aggregation (CA) as follows:

5.5 Carrier Aggregation

In Carrier Aggregation (CA), two or more Component Carriers (CCs) are aggregated in order to support wider transmission bandwidths up to 100 MHz. A UE may simultaneously receive or transmit on one or multiple CCs depending on its capabilities:

A UE with single timing advance capability for CA can simultaneously receive and/or transmit on multiple CCs corresponding to multiple serving cells sharing the same timing advance (multiple serving cells grouped in one TAG);

A UE with multiple timing advance capability for CA can simultaneously receive and/or transmit on multiple CCs corresponding to multiple serving cells with different timing advances (multiple serving cells grouped in multiple TAGs). E-UTRAN ensures that each TAG contains at least one serving cell;

A non-CA capable UE can receive on a single CC and transmit on a single CC corresponding to one serving cell only (one serving cell in one TAG).

CA is supported for both contiguous and non-contiguous CCs with each CC limited to a maximum of 110 Resource Blocks in the frequency domain using the Rel-8/9 numerology.

It is possible to configure a UE to aggregate a different number of CCs originating from the same eNB and of possibly different bandwidths in the UL and the DL:

The number of DL CCs that can be configured depends on the DL aggregation capability of the UE;

The number of UL CCs that can be configured depends on the UL aggregation capability of the UE;

It is not possible to configure a UE with more UL CCs than DL CCs;

In typical TDD deployments, the number of CCs and the bandwidth of each CC in UL and DL is the same.

The number of TAGs that can be configured depends on the TAG capability of the UE.

CCs originating from the same eNB need not to provide the same coverage.

CCs shall be LTE Rel-8/9 compatible. Nevertheless, existing mechanisms (e.g. barring) may be used to avoid Rel-8/9 UEs to camp on a CC.

The spacing between centre frequencies of contiguously aggregated CCs shall be a multiple of 300 kHz. This is in order to be compatible with the 100 kHz frequency raster of Rel-8/9 and at the same time preserve orthogonality of the subcarriers with 15 kHz spacing. Depending on the aggregation scenario, the n×300 kHz spacing can be facilitated by insertion of a low number of unused subcarriers between contiguous CCs.

7.5 Carrier Aggregation

When CA is configured, the UE only has one RRC connection with the network. At RRC connection establishment/re-establishment/handover, one serving cell provides the NAS mobility information (e.g. TAI), and at RRC connection re-establishment/handover, one serving cell provides the security input. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC).

Depending on UE capabilities, Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC).

The configured set of serving cells for a UE therefore always consists of one PCell and one or more SCells:

For each SCell the usage of uplink resources by the UE in addition to the downlink ones is configurable (the number of DL SCCs configured is therefore always larger than or equal to the number of UL SCCs and no SCell can be configured for usage of uplink resources only);

From a UE viewpoint, each uplink resource only belongs to one serving cell;

The number of serving cells that can be configured depends on the aggregation capability of the UE (see subclause 5.5);

PCell can only be changed with handover procedure (i.e. with security key change and RACH procedure);

PCell is used for transmission of PUCCH;

Unlike SCells, PCell cannot be de-activated (see subclause 11.2);

Re-establishment is triggered when PCell experiences RLF, not when SCells experience RLF;

NAS information is taken from PCell.

The reconfiguration, addition and removal of SCells can be performed by RRC. At intra-LTE handover, RRC can also add, remove, or reconfigure SCells for usage with the target PCell. When adding a new SCell, dedicated RRC signalling is used for sending all required system information of the SCell i.e. while in connected mode, UEs need not acquire broadcasted system information directly from the SCells.

3GPP TS36.331 discloses the following about CA:

5.3.5.4 Reception of an RRCConnectionReconfiguration Including the mobilityControlInfo by the UE (Handover)

If the RRCConnectionReconfiguration message includes the mobilityControlInfo and the UE is able to comply with the configuration included in this message, the UE shall:

1> stop timer T310, if running:
1> start timer T304 with the timer value set to t304, as included in the mobilityControlInfo;
1> if the carrierFreq is included:
2> consider the target PCell to be one on the frequency indicated by the carrierFreq with a physical cell identity indicated by the targetPhysCellId;
1> else:
2> consider the target PCell to be one on the frequency of the source PCell with a physical cell identity indicated by the targetPhysCellId;
1> start synchronising to the DL of the target PCell;
NOTE 1: The UE should perform the handover as soon as possible following the reception of the RRC message triggering the handover, which could be before confirming successful reception (HARQ and ARQ) of this message.
1> reset MAC;
1> re-establish PDCP for all RBs that are established;
NOTE 2: The handling of the radio bearers after the successful conviction of the PDCP re-establishment, e.g. the re-transmission of unacknowledged PDCP SDUs (as well as the associated status reporting), the handling of the SN and the HFN, is specified in TS 36.323.
1> re-establish RLC for all RBs that are established;
1> configure lower layers to consider the SCell(s), if configured, to be in deactivated state;

1> apply the value of the newUE-Identity as the C-RNTI;
1> if the RRCConnectionReconfiguration message includes the fullConfig:
2> perform the radio configuration procedure as specified in section 5.3.5.8;
1> configure lower layers in accordance with the received radioResourceConfigCommon;
1> configure lower layers in accordance with any additional fields, not covered in the previous, if included in the received mobilityControlInfo;
1> if the RRCConnectionReconfiguration message includes the radioResourceConfigDedicated:
2> perform the radio resource configuration procedure as specified in 5.3.10;
1> if the keyChangeIndicator received in the securityConfigHO is set to TRUE:
2> update the $K_{eNB}$ key based on the fresh $K_{ASME}$ key taken into use with the previous successful NAS SMC procedure, as specified in TS 33.401;
1> else:
2> update the $K_{eNB}$ key based on the current $K_{eNB}$ or the NH, using the nextHopChainingCount valve indicated in the securityConfigHO, as specified in TS 33.401;
1> store the nextHopChainingCount value;
1> if the securityAlgorithmConfig is included in the securityConfigHO:
2> derive the $K_{RRCint}$ key associated with the integrityProtAlgorithm, as specified in TS 33.401;
2> if connected as an RN:
3> derive the $K_{UPint}$ key associated with the integrityProtAlgorithm, as specified in TS 33.401;
2> derive the $K_{RRCenc}$ key and the $K_{UPenc}$ key associated with the cipheringAlgorithm, as specified in TS 33.401;
1> else:
2> derive the $K_{RRCint}$ key associated with the current integrity algorithm, as specified in TS 33.401;
2> if connected as an RN:
3> derive the $K_{UPint}$ key associated with the current integrity algorithm, as specified in TS 33.401;
2> derive the $K_{RRCenc}$ key and the $K_{UPenc}$ key associated with the current ciphering algorithm, as specified in TS 33.401;
1> configure lower layers to apply the integrity protection algorithm and the $K_{RRCint}$ key, i.e. the integrity protection configuration shall be applied to all subsequent messages received and sent by the UE, including the message used to indicate the successful completion of the procedure;
1> configure lower layers to apply the ciphering algorithm, the $K_{RRCenc}$ key and the $K_{UPenc}$ key, i.e. the ciphering configuration shall be applied to all subsequent messages received and sent by the UE, including the message used to indicate the successful completion of the procedure;
1> if connected as an RN:
2> configure lower layers to apply the integrity protection algorithm and the $K_{UPint}$ key, for current or subsequently established DRBs that are configured to apply integrity protection, if any;
1> if the received RRCConnectionReconfiguration includes the sCellToReleaseList:
2> perform SCell release as specified in 5.3.10.3a;
1> if the received RRCConnectionReconfiguration includes the sCellToAddModList:
2> perform SCell addition or modification as specified in 5.3.10.3b;

1> if the received RRCConnectionReconfiguration includes the systemInformationBlockType1Dedicated:
2> perform the actions upon reception of the SystemInformationBlockType1 message as specified in 5.2.2.7;
1> perform the measurement related actions as specified in 5.5.6.1;
1> if the RRCConnectionReconfiguration message includes the measConfig:
2> perform the measurement configuration procedure as specified in 5.5.2;
1> perform the measurement identity autonomous removal as specified in 5.5.2.2a;
1> release reportProximityConfig and clear any associated proximity status reporting timer;
1> if the RRCConnectionReconfiguration message includes the otherConfig:
2> perform the other configuration procedure as specified in 5.3.10.9:
1> set the content of RRCConnectionReconfigurationComplete message as follows:
2> if the UE has radio link failure or handover failure information available in VarRLF-Report and if the RPLMN is included in plmn-IdentityList stored in VarRLF-Report:
3> include rlf-InfoAvailable;
2> if the UE has logged measurements available for E-UTRA and if the RPLMN is included in plmn-IdentityList stored in VarLogMeasReport:
3> include the logMeasAvailable;
2> if the UE has connection establishment failure information available in VarConnEstFailReport and if the RPLMN is equal to plmn-Identity stored in VarConnEstFailReport:
3> include connEstFailInfoAvailable;
1> submit the RRCConnectionReconfigurationComplete message to lower layers for transmission;
1> if MAC successfully completes the random access procedure:
2> stop timer T304;
2> apply the parts of the CQI reporting configuration, the scheduling request configuration and the sounding RS configuration that do not require the UE to know the SFN of the target PCell, if any;
2> apply the parts of the measurement and the radio resource configuration that require the UE to know the SFN of the target PCell (e.g. measurement gaps, periodic CQI reporting, scheduling request configuration, sounding RS configuration), if any, upon acquiring the SFN of the target PCell;

NOTE 3: Whenever the UE shall setup or reconfigure a configuration in accordance with a field that is received it applies the new configuration, except for the cases addressed by the above statements.

2> if the UE is configured to provide IDC indications:
3> if the UE has transmitted an InDeviceCoexIndication message during the last 1 second preceding reception of the RRCConnectionReconfiguration message including mobilityControlInfo:
4> initiate transmission of the InDeviceCoexIndication message in accordance with 5.6.9.3;
2> if the UE is configured to provide power preference indications:
3> if the UE has transmitted a UEAssistanceInformation message during the last 1 second preceding reception of the RRCConnectionReconfiguration message including mobilityControlInfo:
4> initiate transmission of the UEAssistanceInformation message in accordance with 5.6.10.3;
2> the procedure ends;

NOTE 4: The UE is not required to determine the SFN of the target PCell by acquiring system information from that cell before performing RACH access in the target PCell.

5.3.10.3b SCell Addition/Modification

The UE shall:
1> for each sCellIndex value included in the sCellToAddModList that is not part of the current UE configuration (SCell addition):
2> add the SCell, corresponding to the cellIdentification, in accordance with the received radioResourceConfigCommonSCell and radioResourceConfigDedicatedSCell;
2> configure lower layers to consider the SCell to be in deactivated state;
1> for each sCellIndex value included in the sCellToAddModList that is part of the current UE configuration (SCell modification):
2> modify the SCell configuration in accordance with the received radioResourceConfigDedicatedSCell;

```
SCellToAddModList-r10 ::=            SEQUENCE (SIZE (1..maxSCell-r10)) OF SCellToAddMod-r10
SCellToAddMod-r10 ::=                SEQUENCE {
    sCellIndex-r10                       SCellIndex-r10,
    cellIdentification-r10               SEQUENCE {
        physCellId-r10                       PhysCellId,
        dl-CarrierFreq-r10                   ARFCN-ValueEUTRA
    }                                                            OPTIONAL,  -- Cond SCellAdd
    radioResourceConfigCommonSCell-r10   RadioResourceConfigCommonSCell-r10 OPTIONAL,  -- Cond
SCellAdd
    radioResourceConfigDedicatedSCell-r10   RadioResourceConfigDedicatedSCell-r10   OPTIONAL, --
Cond SCellAdd2
    ...,
    [[ dl-CarrierFreq-v1090              ARFCN-ValueEUTRA-v9e0   OPTIONAL   -- Cond
                                         EARFCN-max
    ]]
}
RadioResourceConfigCommonSCell-r10 ::=   SEQUENCE {
    -- DL configuration as well as configuration applicable for DL and UL
    nonUL-Configuration-r10              SEQUENCE {
        -- 1: Cell characteristics
        dl-Bandwidth-r10                     ENUMERATED {n6, n15, n25, n50, n75, n100},
        -- 2: Physical configuration, general
        antennaInfoCommon-r10                AntennaInfoCommon,
        mbsfn-SubframeConfigList-r10         MBSFN-SubframeConfigList    OPTIONAL,   -- Need OR
        -- 3: Physical configuration, control
```

```
    phich-Config-r10                        PHICH-Config,
    -- 4: Physical configuration, physical channels
    pdsch-ConfigCommon-r10                  PDSCH-ConfigCommon,
    tdd-Config-r10                          TDD-Config                    OPTIONAL    -- Cond
TDDSCell
  },
  -- UL configuration
  ul-Configuration-r10                      SEQUENCE {
    ul-FreqInfo-r10                         SEQUENCE {
      ul-CarrierFreq-r10                    ARFCN-ValueEUTRA              OPTIONAL,   -- Need OP
      ul-Bandwidth-r10                      ENUMERATED {n6, n15,
                                              n25, n50, n75, n100}        OPTIONAL,   -- Need OP
      additionalSpectrumEmissionSCell-r10   AdditionalSpectrumEmission
    },
    p-Max-r10                               P-Max                         OPTIONAL,   -- Need OP
    uplinkPowerControlCommonSCell-r10       UplinkPowerControlCommonSCell-r10,
    -- A special version of IE UplinkPowerControlCommon may be introduced
    -- 3: Physical configuration, control
    soundingRS-UL-ConfigCommon-r10          SoundingRS-UL-ConfigCommon,
    ul-CyclicPrefixLength-r10               UL-CyclicPrefixLength,
    -- 4: Physical configuration, physical channels
    prach-ConfigSCell-r10                   PRACH-ConfigSCell-r10         OPTIONAL,   -- Cond
TDD-OR-NoR11
    pusch-ConfigCommon-r10                  PUSCH-ConfigCommon
  }                                                                       OPTIONAL,   -- Need OR
  ...,
  [[ ul-CarrierFreq-v1090                   ARFCN-ValueEUTRA-v9e0         OPTIONAL    -- Need OP
  ]],
  [[ rach-ConfigCommonSCell-r11             RACH-ConfigCommonSCell-r11    OPTIONAL,   -- Cond UL
    prach-ConfigSCell-r11                   PRACH-Config                  OPTIONAL,   -- Cond UL
    tdd-Config-v1130                        TDD-Config-v1130   OPTIONAL,              -- Cond TDD2
    uplinkPowerControlCommonSCell-v1130
                                UplinkPowerControlCommonSCell-v1130 OPTIONAL  -- Cond UL
  ]]
}
RadioResourceConfigDedicatedSCell-r10 ::=   SEQUENCE {
  -- UE specific configuration extensions applicable for an SCell
  physicalConfigDedicatedSCell-r10          PhysicalConfigDedicatedSCell-r10    OPTIONAL, -- Need
ON
  ...,
  [[ mac-MainConfigSCell-r11                MAC-MainConfigSCell-r11  OPTIONAL       -- Cond
SCellAdd
  ]]
}
```

MobilityControlInfo

The IE MobilityControlInfo includes parameters relevant for network controlled mobility to/within E-UTRA.

MobilityControlInfo Information Element

```
-- ASN1START
MobilityControlInfo ::=    SEQUENCE {
  targetPhysCellId              PhysCellId,
  carrierFreq                   CarrierFreciEUTRA         OPTIONAL,  -- Cond HO-
toEUTRA2
  carrierBandwidth              CarrierBandwidthEUTRA     OPTIONAL,  -- Cond HO-
toEUTRA
  additionalSpectrumEmission    AdditionalSpectrumEmission OPTIONAL, -- Cond HO-
toEUTRA
  t304                          ENUMERATED {
                                  ms50, ms100, ms150, ms200, ms500, ms1000,
                                  ms2000, spare1},
  newUE-Identity                C-RNTI,
  radioResourceConfigCommon     RadioResourceConfigCommon,
  rach-ConfigDedicated          RACH-ConfigDedicated      OPTIONAL,  -- Need OP
  ...,
  [[ carrierFreq-v9e0           CarrierFreqEUTRA-v9e0     OPTIONAL   -- Need ON
  ]],
  [[ drb-ContinueROHC-r11       ENUMERATED {true}         OPTIONAL   -- Cond HO
  ]]
}
CarrierBandwidthEUTRA ::=    SEQUENCE {
  dl-Bandwidth                  ENUMERATED {
                                  n6, n15, n25, n50, n75, n100, spare10,
```

```
                            spare9, spare8, spare7, spare6, spare5,
                            spare4, spare3, spare2, spare1},
    ul-Bandwidth            ENUMERATED {
                            n6, n15, n25, n50, n75, n100, spare10,
                            spare9, spare8, spare7, spare6, spare5,
                            spare4, spare3, spare2, spare1}     OPTIONAL -- Need OP
}
CarrierFreqEUTRA ::=        SEQUENCE {
    dl-CarrierFreq          ARECN-ValueEUTRA,
    ul-CarrierFreq          ARFCN-ValueEUTRA      OPTIONAL   -- Cond FDD
}
CarrierFreqEUTRA-v9e0 ::=   SEQUENCE {
    dl-CarrierFreq-v9e0     ARECN-ValueEUTRA-r9,
    ul-CarrierFreq-v9e0     ARECN-ValueEUTRA-r9   OPTIONAL   -- Cond FDD
}
-- ASN1STOP
```

3GPP R2-130420 discusses protocol architecture alternatives for dual connectivity. Alternative U3 is a centralized PDCP termination and Alternative U4 is a distributed protocol termination for user plane. The pros and cons of these two alternatives are quoted below:

3.3 Alternative U3: Centralized PDCP Termination
   Pros:
      No extra load on EPC in terms of number of connections and path switches
   Cons:
      Requirements on backhaul between macro and low power node
         High capacity
         Medium/Loose latency (PDCP reordering)
      User data need to pass through central point 3.4 Alternative U4: Distributed Protocol Termination
   Pros:
      Supports local breakout at the low power eNB. User plane can be optimized towards EPC
      Good support for non-ideal backhaul
      No user data transmission required between macro and low power eNBs
      Establishing/removing low power node connectivity and PDCP/RLC relocation can be based on Rel-8 handover procedure with PDCP forwarding.
   Cons:
      Extra load on EPC in terms of number of connections and path switches
      Possible security implications need further study 3GPP R2-130570 discusses scenarios and benefits of dual connectivity. It also addresses several protocol architecture alternatives for dual connectivity.

When UE is configured with both a Macro Cell and Small Cell, a PUCCH resource may be also needed for Small Cell due to uplink acknowledgement for DL data. However, PUCCH resource is typically configured for Macro Cell/PCell, it may be possible to configure PUCCH resources for scheduling requests on a Small Cell. Due to potential issues of non-ideal backhaul between the Macro Cell and the Small Cell, resource scheduling probably should be done in Small Cell itself.

Since some specific service and Control-plane data can be handled on Macro Cell and User-plane data can be handled on Small Cell, it may be possible that some service/data can be served simultaneously by both Macro and Small Cells.

If a UE is configured with more than one SR resource on PUCCH (which might be on the same Cell or different Cells), specific methods and/or coordination for the SR resources may be used to improve the efficiency of requesting UL resources of Macro or Small Cells.

If a configuration method used in Carrier Aggregation (CA) is utilized, a Small Cell might be configured as a Secondary Cell (SCell) through Radio Resource Control (RRC) signaling as used in a RRC Reconfiguration message. If there is more than one scheduler (e.g. Macro Cell and Small Cell) for a single UE, there may be non-ideal backhaul between these schedulers (i.e. some latency) as well as synchronization problems for resource configuration (e.g. physical or MAC layer operation) when the UE attempts to directly configure such Cell in the UE.

The root cause of the latency and synchronization problems is due to most resources in the Small Cell and/or one scheduler may not be (properly) controlled or handled (well) by a Macro Cell and/or another Cell. The number of action/signaling that the UE needs to connect a (very first) Small Cell would be based on loose or tight coordination between the Macro Cell and the Small Cell.

In the following embodiments, a resource scheduler may be defined as resource allocator, Macro Cell/eNB, Small Cell/eNB, eNB, PCell or SCell. Macro Cell/eNB and Small Cell/eNB may be located in different geographical locations.

In the various embodiments, procedures and/or messages for adding a (very) first Small Cell are disclosed herein. Upon addition of a very first Small Cell, the UE would consider it as a kind of PCell in a Small Cell eNB. The very first Small Cell may belong to an eNB different from the Macro Cell eNB, and the procedure or message is able to carry UE ID information such as Cell Radio Network Temporary Identifier (C-RNTI) which will be used in the Small Cell. If the UE receives such information, the UE will then use this information in Small Cell. If UE does not receive such information, the UE may use the information provided in the Macro Cell or the UE may execute a Random Access (RA) procedure on Small Cell.

Considering the above behavior of whether the UE ID information should be carried by the procedure or message, C-RNTI filed in the concerned message is allowed not present or it is still always present but some specific value would imply no valid C-RNTI allocation so UE need to acquire C-RNTI by itself, which may be through a RA procedure on Small Cell.

In one embodiment, if C-RNTI information used in Small Cell is not provided to the Small Cell addition message (which is a RRC message that is used to add the very first Cell of the Small Cell eNB and C-RNTI information used in the Small Cell eNB may or may not be included in this message), then the UE will acquire it by a RA procedure.

The UE, by itself, may need to execute the RA procedure in order to obtain the C-RNTI information because there may not be a dedicated RACH configuration included in the Small Cell addition message. The UE also may need to perform UL synchronization and provide some specific information to inform the Small Cell of the UE (e.g., who UE is or where UE is from). For example, in one embodiment, the specific information includes information provided in UE Contention Resolution Identity or Macro Cell information.

In another embodiment, the message for adding a very first Small Cell may be used to configure more than one Cell (including the very first Small Cell) at the same time and/or per message in Small Cell eNB. The message carries information including which cell of a Small Cell eNB is the Primary Cell (PCell). By identifying the PCell of the Small Cell eNB, the UE can perform a Random Access Channel (RACH) procedure, if needed. Alternatively, the UE can apply the relevant restriction/operation on the PCell of Small Cell eNB similar to the definition of PDCCH-subframe in Small Cell eNB, SPS operation, or the like. In yet another alternative, this information may be implicitly derived from some specific configuration like PUCCH or MAC operation.

In one embodiment, the UE is connected to a Macro Cell eNB. The Macro Cell eNB configures the UE to connect/establish a (very first) Small Cell belonging to a Small Cell eNB different from Macro Cell eNB through a (RRC) message. If there is more than one Small Cell or only one Small Cell configured in the message, the message would indicate which Cell is PCell of the Small Cell eNB. If there is only one Small Cell configured in the message, the UE would directly consider the Small Cell as the PCell of the Small Cell eNB.

In one embodiment, the UE would perform RA procedure to respond to a procedure and/or message for adding a (very) first Small Cell in response to a specific condition such as, but not limited to, the absence of a C-RNTI, no UL synchronization (with or without C-RNTI), or the like.

In one embodiment, the Small Cell addition request message could be sent from Macro eNB to the UE, and the UE would send the complete message to the Small Cell or Macro Cell. In one embodiment, if a RA procedure is performed in the Small Cell when adding the very first Small Cell, then the complete message could be sent to Small Cell. If the complete message is send to Small Cell, a (pre)-configured logical channel may be provided for this purpose.

In one embodiment, the procedure of adding a Small Cell should be done within a specific time period, which may be implemented by a timer. In one embodiment, the time period starts from the start of the establishment of the (very first) Small Cell procedure. If the procedure is not complete within the predefined time period, the UE would send information and/or a message back to the Macro Cell to inform the Macro Cell that the addition/access failed.

The very first Small Cell mentioned above may be configured in both DL/UL directions.

The procedure described above is a kind of hybrid procedure from SCell addition, Handover, and Connection Setup procedure for configuring UE to connect a Small Cell because it is not just a pure handover completely from one eNB to another eNB (still keeping one connection) but adding a very first cell of another eNB for UE to have one more connection.

Referring back to FIGS. 3 and 4, the device 300 includes a program code 312 stored in memory 310. In one embodiment, the CPU 308 could execute program code 312 to execute one or more of the following: (i) to connect a user equipment (UE) to a Macro eNB; and; (ii) to configure the UE to establish a very first Small Cell through a Radio Resource Control (RRC) message, wherein the very first Small Cell belongs to a Small Cell eNB different from the Macro eNB.

In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for small cell enhancement in a wireless communication system, the method comprising:
    having a user equipment (UE) connected to a Macro evolved Node B (eNB) and a Small Cell eNB that is different from the Macro eNB;
    configuring the UE to establish a first Small Cell through a Radio Resource Control (RRC) message, wherein the first Small Cell belongs to the Small Cell eNB;
    determining whether more than one Small Cell is configured by the RRC message within the Small Cell eNB;
    indicating which Small Cell is a Primary Cell of the Small Cell eNB in response to determining that more than one Small Cell is configured by the RRC message within the Small Cell eNB; and
    performing a Random Access (RA) procedure on the Small Cell, which is indicated as the Primary Cell of the Small Cell eNB, in response to the RRC message attempting to establish that the first Small Cell belongs to the Small Cell eNB.

2. The method of claim 1, further comprising:
    initiating a timer when the UE attempts to establish the first Small Cell; and
    sending a message back to Macro Cell regarding the failure of adding the first Small Cell.

3. The method of claim 1, further comprising:
    receiving, by the UE, the RRC message sent from the Macro eNB; and
    sending, by the UE, a complete message associated with the RRC message to the Macro eNB.

4. The method of claim 1, further comprising:
    receiving, by the UE, the RRC message sent from the Macro eNB; and
    sending, by the UE, a complete message associated with the RRC message to the Small Cell eNB.

5. The method of claim 1, wherein the RRC message includes a Cell Radio Network Temporary Identifier (C-RNTI) to be used in the first Small Cell.

6. The method of claim 1, wherein the RRC message does not include a Cell Radio Network Temporary Identifier (C-RNTI).

7. The method of claim 1, further comprising: receiving a Cell Radio Network Temporary Identifier (C-RNTI) from the RA procedure.

8. The method of claim 1, further comprising: using an uplink (UL) synchronization received from the RA procedure.

9. A communication device for improving a new carrier type in a wireless communication system, the communication device comprising:
    a control circuit;
    a processor installed in the control circuit; and
    a memory installed in the control circuit and operatively coupled to the processor;
    wherein the processor is configured to execute a program code stored in the memory to provide small cell enhancement in a wireless communication system by:
        having a user equipment (UE) connected to a Macro evolved Node B (eNB) and a Small Cell eNB that is different from the Macro eNB;
        configuring the UE to establish a first Small Cell through a Radio Resource Control (RRC) message, wherein the first Small Cell belongs to the Small Cell eNB;
        determining whether more than one Small Cell is configured by the RRC message within the Small Cell eNB;
        indicating which Small Cell is a Primary Cell of the Small Cell eNB in response to determining that more than one Small Cell is configured by the RRC message within the Small Cell eNB; and
        performing a Random Access (RA) procedure on the Small Cell, which is indicated as the Primary Cell of the Small Cell eNB, in response to the RRC message attempting to establish that the first Small Cell belongs to the Small Cell eNB.

10. The communication device of claim 9, wherein the program code is further configured to initiate a timer when the UE attempts to establish the first Small Cell.

11. The communication device of claim 9, wherein the program code is further configured to receive, by the UE, the RRC message sent from the Macro eNB; and send, by the UE, a complete message associated with the RRC message to the Macro eNB.

12. The communication device of claim 9, wherein the program code is further configured to receive, by the UE, the RRC message sent from the Macro eNB; and send, by the UE, a complete message associated with the RRC message to the Small Cell eNB.

13. The communication device of claim 9, wherein the RRC message includes a Cell Radio Network Temporary Identifier (C-RNTI) to be used in the first Small Cell.

14. The communication device of claim 9, wherein the RRC message does not include a Cell Radio Network Temporary Identifier (C-RNTI) to be used in the first Small Cell.

15. The communication device of claim 9, wherein the program code is further configured to receive a Cell Radio Network Temporary Identifier (C-RNTI) from the RA procedure.

16. The communication device of claim 9, wherein the program code is further configured to use an uplink (UL) synchronization received from the RA procedure.

* * * * *